US006682619B2

United States Patent
Cermignani et al.

(10) Patent No.: US 6,682,619 B2
(45) Date of Patent: Jan. 27, 2004

(54) COMPOSITE PRE-PREG PLY HAVING TAILORED DIELECTRICAL PROPERTIES AND METHOD OF FABRICATION THEREOF

(75) Inventors: William Cermignani, Milford, CT (US); Joseph Panalone, III, Guilford, CT (US); Leonard J. Doolin, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 176 days.

(21) Appl. No.: 09/907,432

(22) Filed: Jul. 17, 2001

(65) Prior Publication Data

US 2003/0017335 A1 Jan. 23, 2003

(51) Int. Cl.$^7$ .............................. B32B 31/16
(52) U.S. Cl. ................ 156/73.1; 156/150; 156/151; 156/247; 156/285; 156/289; 156/312; 427/472; 427/565; 427/213.31; 427/249.3; 427/212
(58) Field of Search .............. 428/379, 297.4, 428/300.1, 323, 408, 361; 156/196, 312, 272.2, 247, 73.1, 285, 289, 62.2, 150, 151; 427/471, 472, 565, 212, 213.31, 249.3

(56) References Cited

U.S. PATENT DOCUMENTS

| | | | |
|---|---|---|---|
| 4,510,103 A | 4/1985 | Yamaguchi et al. | |
| 4,716,417 A | 12/1987 | Grumet | |
| 4,892,626 A * | 1/1990 | Covey | 204/15 |
| 5,057,253 A | 10/1991 | Knoblach | |
| 5,089,325 A * | 2/1992 | Covey | 428/246 |
| 5,248,242 A | 9/1993 | Lallo et al. | |
| 5,283,026 A | 2/1994 | Okumura et al. | |
| 5,360,629 A * | 11/1994 | Milbourn et al. | 427/8 |
| 5,482,589 A * | 1/1996 | Shin et al. | 156/268 |
| 5,547,629 A | 8/1996 | Diesen et al. | |
| 5,817,269 A | 10/1998 | Younie et al. | |
| 5,853,882 A * | 12/1998 | Cenedella et al. | 428/379 |
| 6,048,426 A | 4/2000 | Pratt | |
| 6,162,314 A | 12/2000 | Kassuelke et al. | |
| 6,528,145 B1 * | 3/2003 | Berger et al. | 428/156 |

* cited by examiner

Primary Examiner—Merrick Dixon
(74) Attorney, Agent, or Firm—Carlson, Gaskey & Olds

(57) ABSTRACT

A structural dielectrically tailored prepreg panel includes structural materials having desired electrical qualities in one or more desired areas without loss of structural integrity or the addition of parasitic weight. In one method of manufacture an applicator such as a spray nozzle applies a first dielectric material to a first area not covered by a mask. In another method, the dielectric material includes a dry material, which is sprinkled upon a tacky impregnating resin in a controlled volume percentage to provide a dielectric gradient. In yet another embodiment an applicator arrangement includes a plurality of applicators arranged to form a multiple of applicator sets which communicates with a controller to selectively activate a particular applicator and dispense a desired dielectric resin in a desired location.

19 Claims, 3 Drawing Sheets

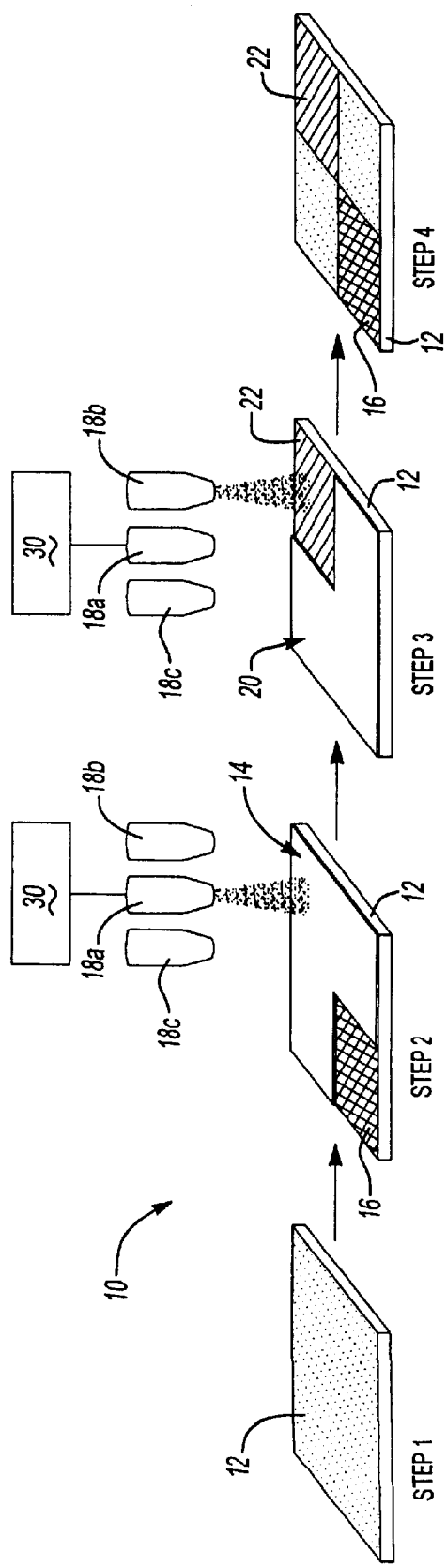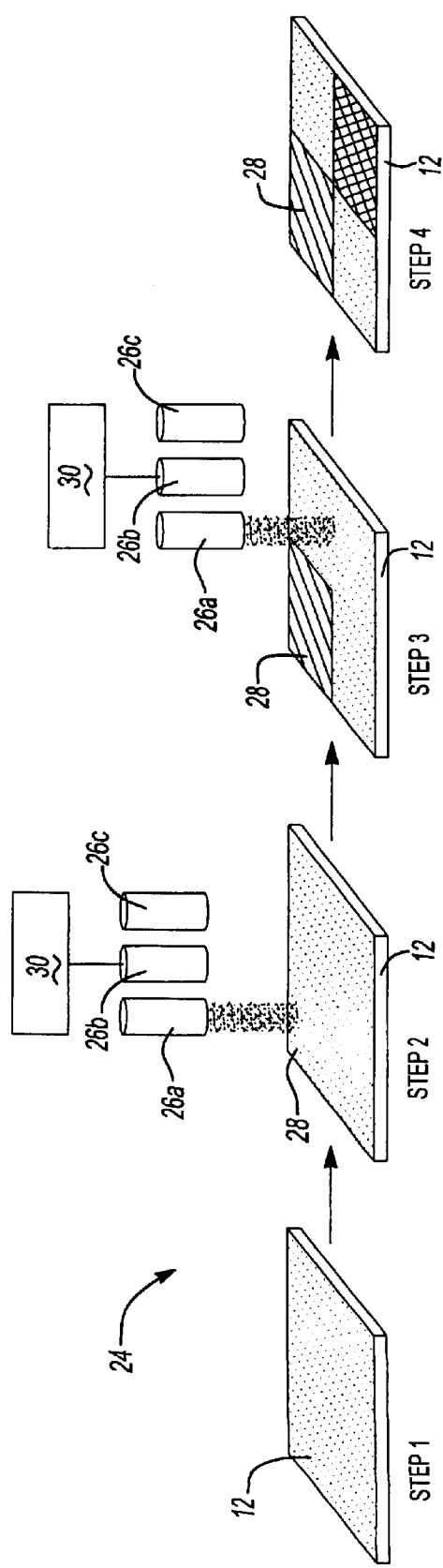

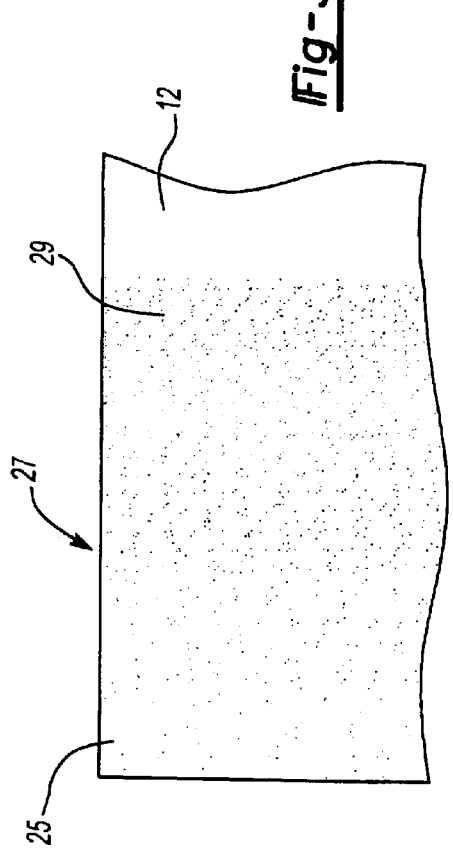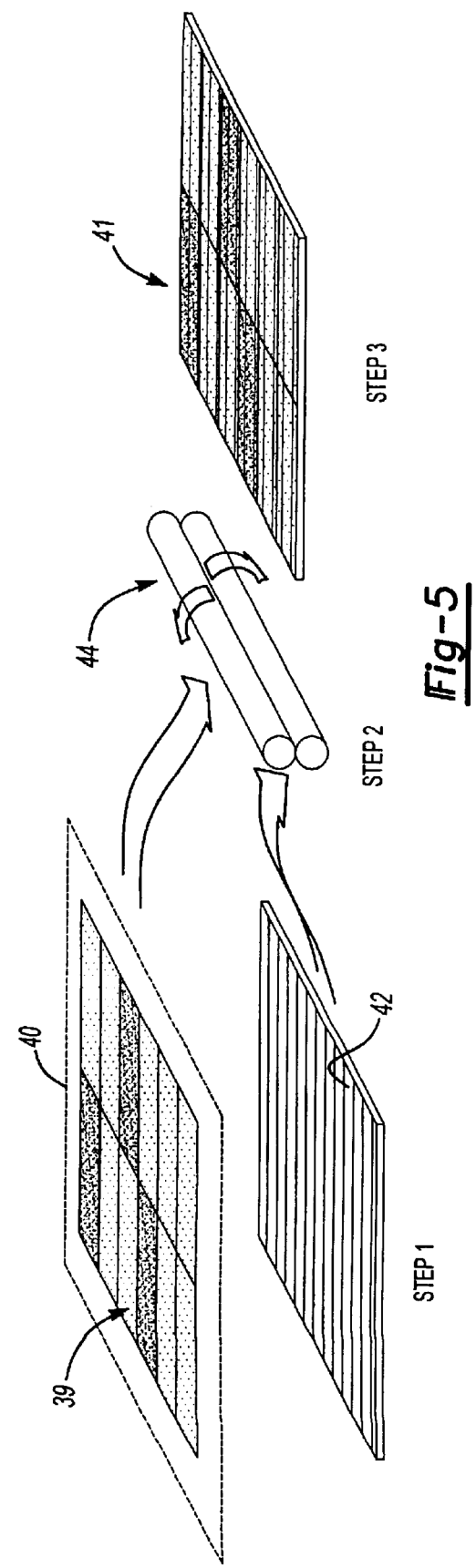

COMPOSITE PRE-PREG PLY HAVING TAILORED DIELECTRICAL PROPERTIES AND METHOD OF FABRICATION THEREOF

BACKGROUND OF THE INVENTION

The present invention relates to a composite pre-preg which exhibits desired electrical properties without loss of structural integrity or the addition of parasitic weight, and a method of preparing the composite prepreg ply.

Articles fabricated from fiber reinforced resin matrix composite materials are known, and have found increasing use in load bearing structural applications due to their high strength, light weight, and ability to be fashioned into complex shapes. Such composite structural materials are particularly suitable for aircraft structures.

In many aerospace and electronics applications, including EMI shielding/attenuation, antennas, aircraft structures components and anechoic chambers, it is desirable to impart certain electrical properties to the composite structure. It is further desirable to provide a composite structure with rather complex electrical properties where various dielectric constants are desired to be located in close proximity and in a particularly tailored pattern or design.

In conventional applications where dielectric tailoring is desired, a plurality of prepegs are formed such that each has a desired dielectric constant. Each prepreg is then cut to the final shape and assembled in a lay up such that the final composite component exhibits the desired dielectric constant in the desired area. Disadvantageously, each dielectric constant area is a separate prepreg which has been placed next to others during layup. This "cut and paste" arrangement, although exhibiting the desired dielectric constant pattern, cannot exhibit structural properties of a single substrate having a continues fiber orientation. Moreover, forming a single component from multiple pieces suffers from other disadvantages, including the addition of parasitic weight, secondary processing complications, increased layup costs due to the inclusion and assembly of many pieces, and limitation to discrete regions each of which define a single dielectric constant.

Accordingly, it is desirable to provide a method facilitating the manufacture of a composite structure providing multiple different dielectric constant regions without reducing structural integrity. It is further desirable to provide a composite structure which exhibits a graduated dielectric constant profile rather than discrete areas of a single dielectric constant.

SUMMARY OF THE INVENTION

A structurally dielectrically tailored prepreg panel or component according to the present invention provides a 2-dimensional dielectrically tailored (2DDT) structural material having desired electrical qualities in one or more desired areas of the prepreg without loss of structural integrity or the addition of parasitic weight.

In one method of manufacture a prepreg having predetermined dielectric properties is at least partially covered by a mask. An applicator such as a spray nozzle will then apply a first dielectric material to a first area not covered by the mask. In this method the dielectric material is substantially the same impregnating resin used in the original manufacture of the prepreg but having a different dielectric constant. The first area provides a dielectric constant different than the original prepreg. The process may then be repeated with any number of masks and dielectric materials until the final dielectric design of the prepreg is complete.

Another 2DDT manufacturing process again begins with a prepreg having a predetermined dielectric property. As the prepreg already includes a fiber reinforcement substrate with a formulated impregnating resin in a yet as uncured form, the impregnating resin provides a tacky or adherent surface. In this embodiment, the dielectric material includes a dry material which sticks to the impregnating resin such as a plurality of impurities that can change the dielectric properties of the resin.

The above embodiments alternatively or additionally provide for a continuously graded change of the dielectric content. Multiple dispensers and/or control of the dielectric material and applied volume percentage of each material will provide a dielectric gradient. The volume percentages of one or more dielectric materials having a single predetermined dielectric constant when applied at a certain volume percentage per unit area are applied in other volume percentages to achieve a much greater dielectric constant variation. A graduated dielectric constant rather than a discrete dielectric constant area is therefore provided.

In another embodiment an applicator arrangement 32 includes a plurality of applicators arranged to form a multiple of applicator sets. Each applicator set includes a multiple of applicators each of which dispense a particular dielectric resin. The applicator arrangement preferably communicates with a controller to selectively activate a particular applicator and dispense a desired dielectric resin in a desired location. Preferably, only a single pass of the applicator arrangement is required to manufacture the 2DDT material. The applicator arrangement dispenses the desired dielectric resins directly to a substrate or to a release film for later application to the substrate.

The present invention therefore provides a system and method providing multiple different dielectric constant regions without reducing structural integrity. Further the dielectric constant regions may be of a graduated dielectric constant profile rather than discrete areas of a single dielectric constant.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general perspective view of one method of manufacturing a composite component;

FIG. 2 is a general perspective view of another method of manufacturing a composite component;

FIG. 3 is a schematic view of a composite component having a two dimensional dielectrically tailored gradient;

FIG. 5 is a general perspective view of one method of manufacturing a two dimensional dielectrically tailored prepreg using the two dimensional dielectrically tailored resin sheet of FIG. 4.

DETAILED DESCRIPTION OF THE PREFERRED EMBODIMENT

Figure 4:
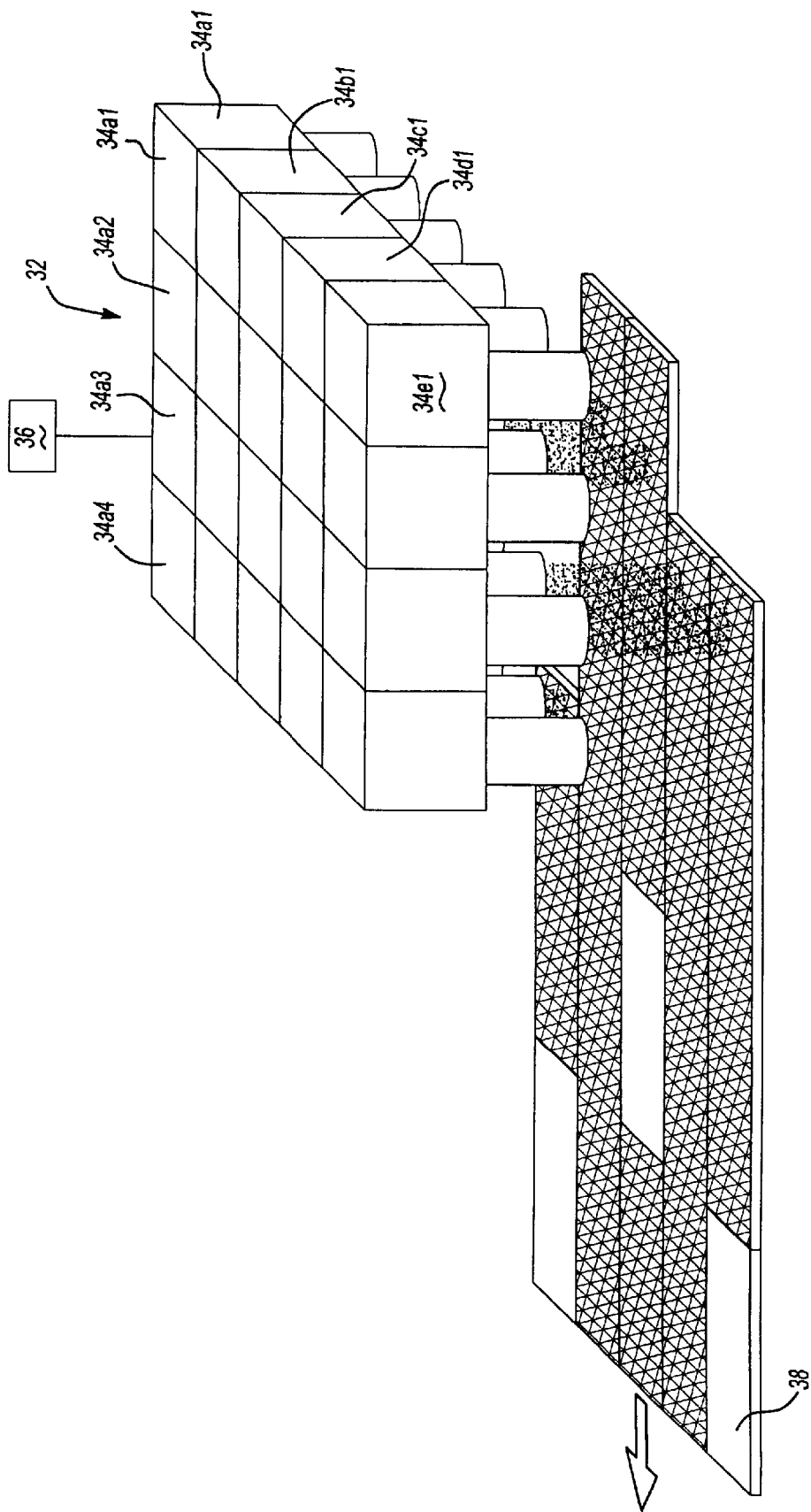
FIG. 4 is a general perspective view of the manufacture of a two dimensional dielectrically tailored resin sheet.

FIG. 1 schematically illustrates the manufacture of a structural dielectrically tailored (graded) prepreg panel or component according to the present invention. The structural dielectrically tailored prepreg provides a 2-dimensional dielectrically tailored (2DDT) structural material having desired electrical qualities in one or more desired areas of the prepreg. The structural dielectrically tailored prepreg provides for the incorporation of desirable electrical properties into a composite prepreg ply without loss of structural integrity or the addition of parasitic weight.

The structural dielectrically tailored prepreg may be incorporated into an otherwise conventional structural composite using conventional techniques. For example only, at least one structural dielectrically tailored prepreg ply may be laid upon another prepreg, thereby obtaining a prepreg stack. The prepreg ply of this invention may be placed at any location in a multiple ply stack. Alternatively, or in addition, a multiple of a structural dielectrically tailored prepregs may be relatively oriented in a single stack to provide dielectric properties in three-dimensions.

In one method, the manufacturing process 10 begins with a prepreg 12 having a predetermined dielectric property. As known, a prepreg is the material resulting from impregnating a fiber reinforcement substrate with a formulated impregnating resin. Prepreg materials are pre-impregnated with an impregnating resin to control the resin content of the material. By specifically tailoring the electrical properties of the impregnating resin and the substrate, a prepreg having consistent uniform dielectric properties are provided. The resulting impregnated substrate is considered a B-staged ply, ready for assembly ("lay up") into a laminate to be cured into a structural composite material.

The substrate is preferably a cloth such as a low dielectric unidirectional tape, woven cloth or nonwoven fabric of interbonding fibers. Suitable low dielectric fibers include high strength fibers such as fiberglass fibers, ceramic fibers and aramid fibers, which are commercially available. Importantly, the present invention provides a prepreg in which a consistent fiber orientation is provided throughout the substrate. In other words a single substrate and not a multiple of joined substrates.

The impregnating resin is preferably a reactive resin component, curing agents and at least one organic solvent. Typical resins include epoxy, epoxy novolacs and other thermosetting resins including polyesters, polyimides (both condensation and addition types), phenolic resins and bismaleimides. The resin may contain a thermoplastic or elastomeric agent to increase fracture resistance.

Referring to Step 2 of FIG. 1, the prepreg 12 is at least partially covered by a mask 14. The mask 14 protects the prepreg but leaves a first area 16 of the prepreg 12 exposed. An applicator (illustrated schematically at 18a–18c), such as a spray nozzle will then apply a first dielectric material to the first area 16. In this embodiment, the dielectric material is substantially the impregnating resin used in the original manufacture of the prepreg 12 but having a different dielectric constant. In other words, a second coat of a different impregnating resin is applied over the original impregnating resin in the first area 16. The first area 16 thus provides a dielectric constant different than the original prepreg 12.

Referring to Step 3 of FIG. 1, the first mask 14 is removed and the prepreg 12 is at least partially covered by a second mask 20. The second mask 20 protects the prepreg and the first area 16, but leaves a second area 22 exposed. A second applicator 18b, such as a spray nozzle will then apply a second dielectric material to the second area 22 as described above. The process may then be repeated with any number of masks and dielectric materials until the final dielectric design of the prepreg is complete (Step 4). Importantly, no structural modification is appended to the original prepreg 12 to achieve the final dielectric design.

Referring to FIG. 2, another 2DDT manufacturing process 24 again begins with a prepreg 12 having a predetermined dielectric property. As the prepreg already includes a fiber reinforcement substrate with a formulated impregnating resin in a yet as uncured form, the impregnating resin provides a tacky or adherent surface. In this embodiment, the dielectric material includes a filler material which sticks to the impregnating resin. The dielectric fillers can be a plurality of fibers, whiskers, particles and so on. One type of filler includes metallic stainless steel fibers, iron fibers, nickel fibers, or silver fibers. Another type of filler includes non-metallic fibers such as carbon fibers, PMN fibers, and PZT fibers.

The dielectric fillers provide a desired dielectric constant to the prepreg in relation to the quantity and type of fibers applied. An applicator (illustrated schematically at 26a–26c), such as a "shaker" applies a first dielectric material, in this embodiment a plurality of fillers to a first area 28. It should be understood that although each individual fiber is relatively small, a difference in length, conductivity, aspect ratio or the like will provide a predetermined dielectric constant when applied in a volume over a surface. The term "plurality of fillers" relates to a plurality of identical fillers which are applied or "sprinkled" in a controlled manner from a dedicated applicator 26a–26c. The applicator sprinkles predetermined volume percentages of certain fibers in the first area 28 to change the dielectric property of the first area 28 (Step 2). The process may then be repeated (Step 3) with another fiber type and volume percentage thereof until the final dielectric design of the prepreg is complete (Step 4). Importantly, no structural modification is appended to the original prepreg 12 to achieve the final dielectric design.

The embodiments illustrated in FIGS. 1 and 2 alternatively or additionally provide for a continuously graded change of the dielectric content. Multiple dispensers and/or control of the dielectric material and applied volume percentage will provide a dielectric gradient. A controller (illustrated schematically at 30 in FIGS. 1 and 2) controls the applicators 18a–18c, 26a–26c such that a predetermined volume percentage of a particular dielectric material is applied.

Preferably, the applicators are controllable by the controller 30 to apply a varied volume percentage per unit area to provide a dielectric gradient. For example only, a relatively small volume percentage of a first fiber is applied at a first end 25 of a prepreg area 27 (FIG. 3) and the volume percentage is ramped up as the dispenser moves from the first end 25 to an opposite end 29 of the first area 27. A technology, which reflects how this method is achieved, is the operation of an inkjet printer. An inkjet printer includes only a few basic ink colors yet achieves a much larger color pallet by adjusting the volume percentage application of one or more of the basic ink colors to achieve a wide spectrum of other colors. The volume percentages of one or more dielectric materials having a single predetermined dielectric constant when applied at a certain volume percentage per unit area are applied in other volume percentages to achieve a much greater dielectric constant variation. A graduated dielectric constant (as schematically illustrated in FIG. 3) rather than a discrete dielectric constant area may thereby be applied using only a minimal number of different impregnating resins having predetermined dielectric constants.

Referring to FIG. 4, an applicator arrangement 32 is provided. The applicator arrangement 32 includes a plurality of applicators arranged to form a multiple of applicator sets 34a–34e. Each applicator set 34a–34e includes a multiple of applicators each of which dispense a particular dielectric resin. The first set 34a includes a first dielectric resin applicator 34a1, a second dielectric resin applicator 34a2, a third dielectric resin applicator 34a3, and a fourth dielectric resin applicator 34a4. Each of the other sets also includes the like applicators 34b1–34b4, 34c1–34c4, etc. It should be understood that although 5 sets of 4 dielectric resins are illustrated in the disclosed embodiment any combination thereof will benefit from the present invention. Further, although the illustrated embodiment provides a substantially linear arrangement, other orientations will also benefit from the present invention.

The applicator arrangement 32 preferably communicates with a controller (illustrated schematically at 36). The controller 36 operates to selectively activate a particular applicator to dispense a desired dielectric resin in a desired location. Preferably, only a single pass of the applicator arrangement 32 is required to manufacture the 2DDT material.

In the 2DDT manufacturing process schematically illustrated in FIG. 4, the applicator arrangement 32 dispenses the desired dielectric resins directly to a substrate 38. A 2DDT prepreg is thereby directly manufactured. Notably, the FIG. 4 embodiment provides a 2DDT prepreg panel from a substrate while the above described embodiments, start with a known prepreg panel having a consistent dielectric characteristic throughout the entire panel. Referring to FIG. 5, another 2DDT manufacturer process 41 is illustrated. The desired dielectric resins 39 are applied to an intermediate material such as a release film 40. Preferably, the dielectric resin design has been applied by an applicator arrangement 32 (FIG. 4) as described with reference to the substrate above. The release film includes a relatively easily removed non-adherent material such as a diamond embossed polyethylene film, or the like which operates as a temporary substrate for the formulated impregnating dielectric resin in a yet as uncured form. Once the release film 40 has received the completed 2DDT design, a second layer of release film (not shown) may be applied to an opposite side of the dielectric resin to form a sandwich like structure to facilitate storage or the like.

To integrate the dielectric resin design 39 with a substrate 42, one layer of release film sandwich is stripped away to expose the dielectric resin design 39. The dielectric resin is then impregnated into the substrate by a hot and/or cold roller system (illustrated schematically at 44). It should be understood that other impregnating systems known to one skilled in the art will also benefit from the present invention. The final 2DDT prepreg is thus complete at step 3.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method for fabricating a composite prepreg, comprising the steps of:
   (1) masking all but a first area of a prepreg ply fiber reinforcement substrate with a formulated impregnating resin in an uncured form and having a consistent fiber orientation throughout;
   (2) depositing a first impregnating resin material having a first predetermined dielectric constant to the prepreg ply fiber reinforcement substrate with a formulated impregnating resin in an uncured form and such that said first impregnating resin adheres to said first area;
   (3) masking all but a second area of the prepreg ply; and
   (4) depositing a second impregnating resin material having a second predetermined dielectric constant to the prepreg ply fiber reinforcement substrate with the formulated impregnating resin in an uncured form such that said second impregnating resin adheres to said second area.

2. A method as recited in claim 1, wherein said depositing in said step (1) and said step (4) includes spraying.

3. A method for fabricating a composite prepreg ply, comprising the steps of:
   (1) depositing a first dielectric material to a first area of a prepreg ply fiber reinforcement substrate with a formulated impregnating resin in an uncured form such that said first dielectric material adheres to the first area to provide a first predetermined dielectric constant in said first area; and
   (2) depositing a second dielectric material to a second area of the prepreg ply fiber reinforcement substrate with a formulated impregnating resin in an uncured form such that said second dielectric material adheres to the second area to provide a second predetermined dielectric constant in said second area.

4. A method as recited in claim 3, wherein said depositing in said step (1) and said step (2) includes shaking the dielectric materials upon said first and second respective areas.

5. A method as recited in claim 4, wherein said depositing in said step (1) includes shaking a first predetermined quantity per unit area of a fiber upon the first area, and said depositing in said step (2) includes shaking a second predetermined quantity per unit area of the fibers upon the second area.

6. A method as recited in claim 4, wherein said depositing in said step (1) and said step (2) provides a continuously graded area dielectric constant between said first area and said second area.

7. A method as recited in claim 3, wherein said depositing in said step (1) and said step (2) are achieved substantially simultaneously.

8. A method for fabricating a composite prepreg ply, comprising the steps of:
   (1) spraying a first dielectric material to a first area of a substrate such that said first dielectric material adheres to the first area to provide a first predetermined dielectric constant in said first area; and
   (2) spraying a second dielectric material to a second area of the substrate simultaneously with said step (1) such that said second dielectric material adheres to the second area to provide a second predetermined dielectric constant in said second area.

9. A method as recited in claim 8, wherein the second dielectric material includes a predetermined volume percentage per unit area of the first dielectric material different from that applied to the first area.

10. A method as recited in claim 4, wherein said spraying of said step (1) and said step (2) provides a continuously graded dielectric constant between said first area and said second area.

11. A method for fabricating a composite prepreg ply, comprising the steps of:
  (1) spraying a first dielectric material to a first area of a release film such that the first area provides a first predetermined dielectric constant;
  (2) spraying a second dielectric material to a second area of a release film such that the first area provides a second predetermined dielectric constant;
  (3) impregnating the first dielectric material and the second dielectric material to a fiber reinforcement substrate with a formulated impregnating resin in an uncured form; and
  (4) removing the release film.

12. A method as recited in claim 11, wherein said step (3) includes impregnating the first and second dielectric materials into the substrate by sandwiching the first and second dielectric materials between the substrate and the release film.

13. A method as recited in claim 12, wherein said step (3) includes compressing the release film and substrate sandwich between rollers.

14. A method for fabricating a composite prepreg ply, comprising the steps of:
  (1) depositing a first dielectric material to a first area of a prepreg ply fiber reinforcement substrate with a formulated impregnating resin in an uncured form such that said first dielectric material adheres to the first area to provide a first predetermined dielectric constant in said first area.

15. A method as recited in claim 14, further comprising the step of:
  masking all but a first area of a prepreg ply such that said first dielectric material adheres to said first area.

16. A method as recited in claim 14, further comprising the step of:
  depositing the first dielectric material to provide a continuously graded area dielectric constant.

17. A method as recited in claim 14, wherein the depositing in said step (1) comprises shaking the dielectric materials upon the first area.

18. A method as recited in claim 14, wherein the first dielectric material includes a filler material which sticks to the formulated impregnating resin.

19. A method as recited in claim 14, wherein the first dielectric material comprises a dry material which sticks to the formulated impregnating resin.

* * * * *

UNITED STATES PATENT AND TRADEMARK OFFICE
CERTIFICATE OF CORRECTION

PATENT NO. : 6,682,619 B2
DATED : January 27, 2004
INVENTOR(S) : Cermignani et al.

It is certified that error appears in the above-identified patent and that said Letters Patent is hereby corrected as shown below:

<u>Title page,</u>
Item [75], Inventors, please change "Joseph Panalone, III, Guilford, CT (US)" to read as -- Joseph Pantalone, III, Guilford, CT (US) --.

Signed and Sealed this

Twentieth Day of April, 2004

JON W. DUDAS
*Acting Director of the United States Patent and Trademark Office*